United States Patent [19]
Sibik et al.

[11] Patent Number: 5,419,146
[45] Date of Patent: May 30, 1995

[54] EVAPORATOR WATER TEMPERATURE CONTROL FOR A CHILLER SYSTEM

[75] Inventors: Lee L. Sibik, Onalaska; Daniel C. Leaver; Paul R. Glamm, both of La Crosse, all of Wis.

[73] Assignee: American Standard Inc., Piscataway, N.J.

[21] Appl. No.: 234,091

[22] Filed: Apr. 28, 1994

[51] Int. Cl.6 .................................. F25B 41/00
[52] U.S. Cl. ........................... 62/115; 62/196.1; 62/204; 62/201; 236/78 D
[58] Field of Search ............. 62/201, 228.5, 204–223, 62/115, 196.1

[56] References Cited

U.S. PATENT DOCUMENTS

| | | | |
|---|---|---|---|
| 4,161,106 | 7/1979 | Savage et al. | 62/115 |
| 4,282,718 | 8/1981 | Kountz et al. | 62/115 |
| 4,498,310 | 2/1985 | Imanishi et al. | 62/211 |
| 4,506,518 | 3/1985 | Yoshikawa et al. | 62/180 |
| 4,574,870 | 3/1986 | Weitman | 165/1 |
| 4,662,190 | 5/1987 | Tischer | 62/470 |
| 4,689,967 | 9/1987 | Han et al. | 62/201 |
| 4,715,190 | 12/1987 | Han et al. | 62/201 |
| 4,730,995 | 3/1988 | Dewhirst | 418/1 |
| 4,762,469 | 8/1988 | Tischer | 417/279 |
| 4,780,061 | 10/1988 | Butterworth | 417/371 |
| 4,928,494 | 5/1990 | Glamm | 62/222 |
| 4,986,085 | 1/1991 | Tischer | 62/225 |
| 5,011,112 | 4/1991 | Glamm | 251/129 |
| 5,027,608 | 7/1991 | Rentmeester et al. | 62/115 |
| 5,083,745 | 1/1992 | Tischer | 251/129 |
| 5,201,648 | 4/1993 | Lakowske | 418/201 |
| 5,203,685 | 4/1993 | Andersen et al. | 418/1 |
| 5,211,026 | 5/1993 | Linnert | 62/175 |
| 5,214,576 | 5/1993 | Tani et al. | 364/162 |
| 5,214,773 | 5/1993 | Endo | 395/61 |
| 5,247,806 | 9/1993 | Ebisu et al. | 62/204 |
| 5,259,210 | 11/1993 | Ohya et al. | 62/212 |

FOREIGN PATENT DOCUMENTS 0176363  7/1990  Japan ..................... 62/201

Primary Examiner—William E. Wayner
Attorney, Agent, or Firm—William J. Beres; William O'Driscoll; Peter D. Ferguson

[57] ABSTRACT

A method of controlling the capacity of a chiller system, the chiller system including a circularly linked compressor, condenser, expansion device, and evaporator. The method comprises the steps of: measuring a first chiller system parameter; determining a first parameter error as a function of the difference between the first parameter and a first setpoint; measuring a second chiller system parameter; determining a second parameter error as a function of the difference between the second parameter and a second setpoint; providing a first mode of capacity control where the compressor is modulated in response to the first parameter error and the expansion valve is modulated in response to the second parameter error; and providing a second mode of capacity control where the compressor is maintained at a minimum capacity and the expansion valve is modulated in response to the first parameter error.

19 Claims, 3 Drawing Sheets

EVAPORATOR WATER TEMPERATURE CONTROL FOR A CHILLER SYSTEM

BACKGROUND OF THE INVENTION

The present invention is directed to a capacity control system for a water chiller system.

In water chiller systems, water is chilled in an evaporator so as to provide a cooling medium for air conditioning use elsewhere. Water is cheap, safe and can easily be transported by piping to an air handler by a first water loop. The air handler exchanges heat between air and water so as to condition the air for use in a zone or building.

Typically the evaporator in a water chiller system is controlling the temperature of the water by heat exchange with refrigerant. The refrigerant circulates throughout the chiller system by means of a refrigerant loop. In the refrigerant loop, the refrigerant leaves the evaporator and enters a compressor where the pressure of the refrigerant is increased so as to change its condensation point. The compressed refrigerant leaves the compressor and enters a condenser where it is condensed from a vapor to a liquid refrigerant by heat exchange with a cooling medium, typically a second water system. The liquid refrigerant is then returned, by means of an expansion device, to the evaporator to continue the cycle through the chiller system. Aspects of typical chiller systems are shown in U.S. Pat. Nos. 4,780,061 to Butterworth; 4,762,469 to Tischer; 4,730,995 to Dewhirst; 4,662,190 to Tischer and 5,201,648 to Lakowske. All of these patents are assigned to the assignee of the present invention and all of these patents are incorporated herein by reference.

Typically, the expansion device in the chiller system is an electronic expansion valve which modulates refrigerant flow through the expansion valve in response to refrigerant superheat as measured after the refrigerant leaves the compressor. Typical electronic expansion valves are shown in U.S. Pat. Nos. 5,083,745 to Tischer; 4,986,085 to Tischer; 4,928,494 to Glamm and 5,011,112 to Glamm. These patents are assigned to the assignee of the present invention and are hereby incorporated by reference.

Typically, the compressor capacity is modulated in response to the leaving water temperature of the evaporator. Various methods of compressor capacity control and chiller capacity control are shown in U.S. Pat. Nos. 5,027,608 to Rentmeester et al.; 5,203,685 to Anderson et al.; 5,211,026 to Linnert; 4,715,190 to Han et al. and 4,689,967 to Han et al. Each of these patents is assigned to the assignee of the present invention and is hereby incorporated by reference.

While these various methods of controlling the expansion device and compressor capacities provide efficient and economical controls, better controls are both possible and desirable.

SUMMARY OF THE INVENTION

It is the principle object of the present invention to provide better controls for water chiller systems.

It is an object feature and advantage of the present invention to provide further capacity control once the compressor has reached the physical limits of its capacity providing range. This extended unloading capacity control is accomplished by modulating the expansion valve in response to the same system parameter to which compressor capacity is modulated. Thus, for example, the compressors capacity is held at its minimum position and the expansion valve is opened in response to the parameter or parameters controlling compressor capacity so as to provide a further reduction in system capacity. In this extended unloading capacity control, the expansion valve is not modulated in response to measured superheat but is modulated in response to leaving water temperature.

It is a further object, feature and advantage of the present invention to provide a control method for determining whether the conventional capacity control method should be used or whether the extended unloading capacity control method should be used.

The present invention provides a method of controlling the capacity of a chiller system, the chiller system including a circularly linked compressor, condenser, expansion device, and evaporator. The method comprises the steps of: measuring a first chiller system parameter; determining a first parameter error as a function of the difference between the first parameter and a first setpoint; measuring a second chiller system parameter; determining a second parameter error as a function of the difference between the second parameter and a second setpoint; providing a first mode of capacity control where the compressor is modulated in response to the first parameter error and the expansion valve is modulated in response to the second parameter error; and providing a second mode of capacity control where the compressor is maintained at a minimum capacity and the expansion valve is modulated in response to the first parameter error.

The present invention also provides a method of controlling the capacity of a chiller system. The method comprises the steps of: determining a needed capacity for the chiller system; adjusting a compressor flow control means to meet the needed capacity; repositioning an expansion valve in response to the adjusting step; determining if the compressor flow control means is at an end of range capacity; and modulating the position of the expansion valve to control chiller system capacity whenever the flow control means has been determined to be at an end of capacity range.

The present invention further provides a method of controlling the capacity of a water chiller system having a variable capacity compressor, a variable capacity expansion device, and an evaporator having a leaving water temperature. The method comprises the steps of: measuring the leaving water temperature; comparing the leaving water temperature to a setpoint so as to determine an error; and modulating an expansion valve to minimize the error.

The present invention also contemplated using fuzzy logic to select the mode of capacity control, including membership rules which are functions of the evaporator differential temperature and the leaving water temperature error.

Finally, the present invention provides a method of selecting between first and second modes of capacity control for a water chiller system including an evaporator having an entering fluid temperature and a leaving fluid temperature. The method comprises the steps of: determining the leaving fluid temperature; determining the entering fluid temperature; determining a differential temperature as a function of the difference between the leaving fluid temperature and the entering fluid temperature; determining a temperature error as a function of the difference between the leaving fluid temperature and a setpoint; and selecting either the first or second mode of capacity control as a function of the temperature differential and the temperature error.

DETAILED DESCRIPTION OF THE DRAWINGS

Figure 1:
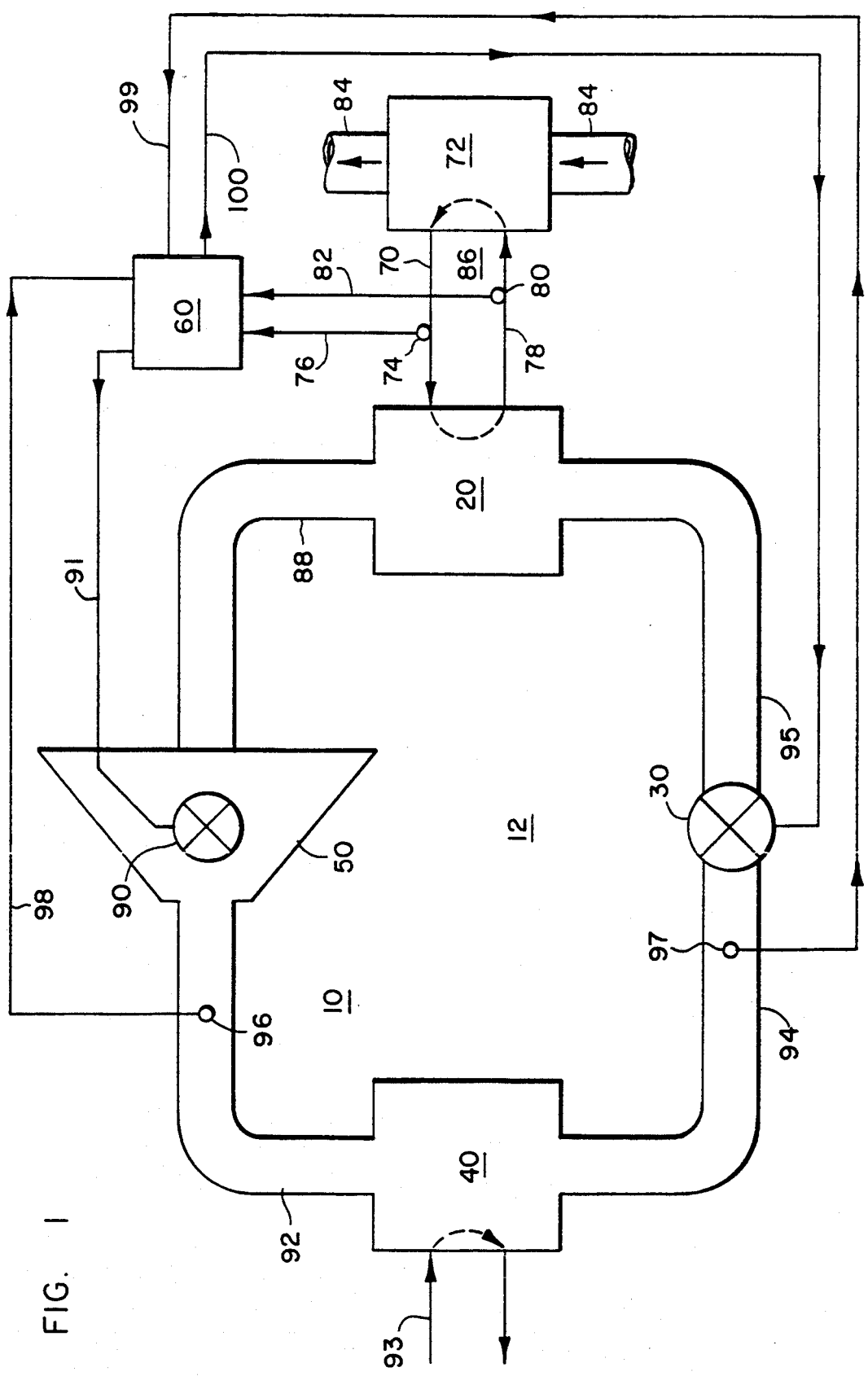
FIG. 1 is a diagram showing a water chiller system to which the present invention applies.

FIG. 1 shows a typical chiller system 10 which uses refrigerant to provide chilled water for air conditioning purposes. The chiller system 10 has a refrigerant loop 12 including an evaporator 20, an expansion device such as an expansion valve 30, a condenser 40 and a compressor 50. The entire system is controlled by an electronic controller 60.

The evaporator 20 uses refrigerant provided to it by the expansion valve 30 to condition water. The entering water is provided by a conduit 70 from an air handler 72 and is measured by an entering water temperature sensor 74. An electrical connection 76 provides the measured entering water temperature to the controller 60. After the entering water has undergone heat exchange in the evaporator 20, it is returned to the air handler 72 by means of a conduit 78. The water leaving the evaporator 20 is commonly known as leaving water. The leaving water temperature is measured by a leaving water temperature sensor 80 and provided to the controller 60 by means of an electrical connection 82. The conditioned leaving water is placed in heat exchange relationship in the air handler 72 with air that is then provided to zones or buildings for air conditioning purposes by means of ducts 84. The air handler 72, the conduits 70, 78 and the evaporator 20 form a first water loop 86.

The refrigerant in the evaporator 20 has been vaporized by the heat exchange with the first water loop 86. As part of the refrigerant loop 12, the vaporous refrigerant leaves the evaporator 20 and is directed to the compressor 50 by a passage 88. In the compressor 50 the refrigerant is compressed so that its condensation point is lowered. The compressor's capacity is modulated by a flow control device such as the piston unloader arrangement shown in U.S. Pat. No. 5,203,685 (previously incorporated by reference). Such an unloader arrangement is designated by the reference numeral 90 and can be controlled by the system controller 60 using an electrical connection 91 and solenoid valves (not shown) or the like as described in U.S. Pat. No. 5,203,685.

The compressed refrigerant leaves the compressor 50 and is directed by a passage 92 to the condenser 40. In the condenser 40, a cooling medium such as a second water loop 93 condenses the compressed vaporous refrigerant to a liquid. The condensed liquid refrigerant is then returned to the evaporator 20 by means of a passage 94, the expansion valve 30 and a passage 95. Effectively, the refrigerant loop 12 comprises the evaporator 20, the passage 88, the compressor 50, the passage 92, the condenser 40, the passage 94, the expansion valve 30 and the passage 95.

The refrigerant superheat is measured as the differential between saturation refrigerant vapor temperature as measured by a sensor 96 in the passage 92 and refrigerant liquid temperature as measured by a sensor 97 located in the passage 94 or in the condenser 40. The signals generated by the sensor 96 and the sensor 97 respectively measurement are provided to the controller 60 by electrical connection 98 and 99. Conventionally, the superheat measured by the sensors 96 and 97 is used to modulate the amount of refrigerant passing through the expansion valve 30. In the present invention, the controller 60 provides such control of the expansion valve 30 by means of an electrical connection 100. The expansion valve 30 is described in more detail in the patents previously incorporated herein.

Conventionally, when the compressor 50 has reached minimum capacity or end-of-range position by means of controlling the unloader 90 to a minimum capacity position, the compressor 50 still provides approximately one-quarter to one-third of its full cooling capacity. The present invention proposes an additional mode of modulating the capacity of the chiller system 10. This additional mode of capacity control or capacity modulation is known as extended unloading. The invention is as follows.

When the compressor 50 has been fully unloaded by the unloader 90, the expansion valve 30 is no longer modulated in response to the superheat measured by the sensors 96 and 97. Instead, the expansion valve 30 is modulated in response to the parameter previously controlling the unloader 90. The parameter controlling the unloader 90 is preferably the leaving water temperature measured by the sensor 80. Effectively, in the extended unloading mode, the compressor 50 is held at its minimum capacity by the unloader 90, and the position of the expansion valve 30 is modulated in response to the leaving water temperature as measured by the sensor 80.

Thus, the invention provides two modes of system capacity control. The first mode is conventional in nature where the compressor capacity is modulated in response to leaving water temperature as measured by a sensor 80 and the expansion valve 30 is modulated in response to superheat as measured by the sensors 96 and 97. The second mode of system capacity control, extended unloading, involves maintaining the compressor 50 at its minimum capacity and modulating the position of the expansion valve 30 in response to leaving water temperature as measured by the sensor 80.

Figure 2:
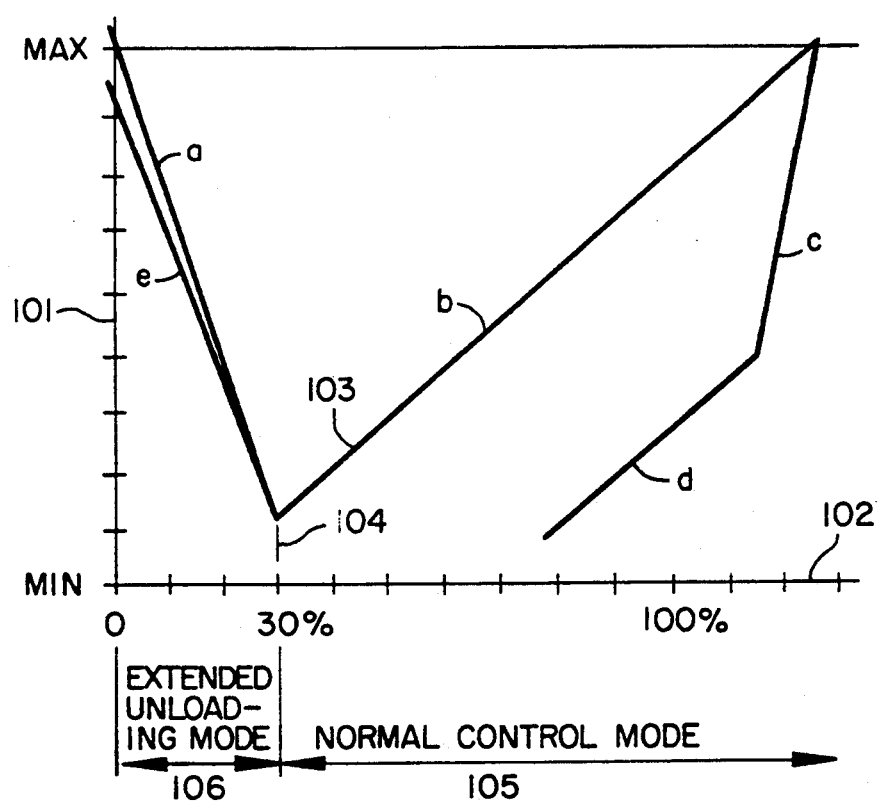
FIG. 2 is a graph of expansion valve position versus system capacity as a percentage of load.

FIG. 2 is an example illustrating the control mode of the expansion valve 30 by comparing the expansion valve position as the ordinate 101 versus the system capacity as a percentage of load as the abscissa 102. A line 103 representing this comparison is broken up into five line segments; A, B, C, D and E. The line segment A represents the start-up control of the expansion valve 30 from a maximum wide open position down to a line 104 at which the normal control mode 105 commences. The line 104 represents minimum compressor capacity. The line segments B, C and D represent an example of the normal control mode 105 where expansion valve position 101 is varied in response to the measured superheat as the system load fluctuates. In the preferred embodiment, the normal control mode 105 is in effect when the system capacity is 30% or greater, the line 104 in this example representing a 30% load. Clearly, the line 104 and its relation to system and compressor capacity is related to the design of the system and will vary dependent on that design. Finally, the line segment E shows the expansion valve position varying during the extending unloading mode 106 while the unloader position 90 is maintained at its minimum capacity position.

The present invention also contemplates a method of determining which mode of system capacity control should be implemented dependent upon the conditions in the system 10.

Figure 3A:
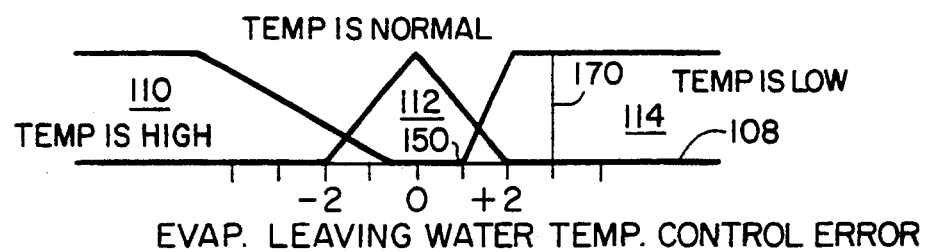
FIG. 3(a) is a graph showing the membership function used in determining the mode of compressor capacity control.
Figure 3B:
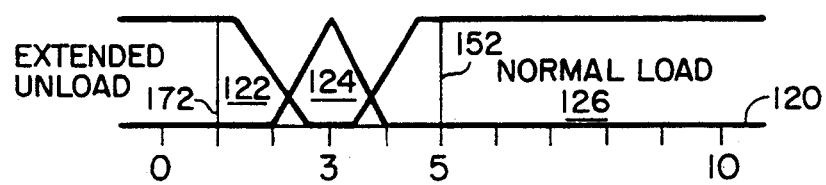
FIG. 3(b) is a graph showing the membership function used in determining the mode of expansion valve control.

The method uses fuzzy logic to switch between the first and second modes of system capacity control. An evaporator water temperature differential (evapdt) is determined by comparing the evaporator entering water temperature measured by the sensor 74 with the leaving water temperature measured by the sensor 80. Next, an evaporator leaving water temperature error (Te) is determined by comparing the evaporator leaving water temperature as measured by the sensor 80 with a leaving water temperature setpoint. The leaving water temperature setpoint can be factory or operator adjusted and is preferably maintained in the controller 60. FIGS. 3a and 3b are a pair of graphs showing the membership functions for the evaporator water temperature differential (evapdt) and the leaving water temperature control error (Te) with regard to the fuzzy logic method of selecting the appropriate mode of system capacity control.

In FIG. 3a, a linear graph 108 of evaporator leaving water temperature control error (Te) is shown. A membership function in a region 110 of high temperature occurs whenever the leaving water temperature control error is less then approximately minus 0.7. A membership in a region 112 of normal temperature region is determined whenever the leaving water temperature control error ranges between minus 2 and plus 2. A membership in a region 114 of low temperature is determined whenever the leaving water temperature control error is greater than approximately 1.

In FIG. 3b, a linear graph 120 of evaporator water temperature differential (evapdt) is shown. The evaporator water temperature differential is determined to have a membership in a region 122 of extended unloading capacity control whenever that differential temperature (evapdt) is less than approximately 2.7. The evaporator water temperature differential is determined to have a membership in a region 124 of transition whenever the temperature differential ranges between 2 and 4. Finally, the evaporator water temperature differential (evapdt) is determined to have a membership in a region 126 of normal load capacity control whenever the evaporator water temperature differential is greater than approximately 3.5.

These memberships are empirically determined, and can and should be varied to meet the needs of any particular chiller system.

To take the inputs, evaporator water temperature differential and leaving water temperature control error, and define their membership in the graphs shown in FIGS. 3a and b, the following pseudo logic is implemented. This is known as fuzzification.

Fuzzify Evaporator Water Temperature Differential (Evapdt)

Unload =MAX [0, (2.7−Evapdt) /1.2]
Load =MAX[0,Evapdt−3.5]
If Evapdt <3 THEN Trans =MAX[0,Evapdt−2]
ELSE Trans =MAX [0,4−Evapdt]

Fuzzify Leaving Water Temperature Control Error (Te)

LowTemp =MAX[0, (Te−1)/3]
HighTemp =MAX[0, (Te+0.5)/5]
If Te <0 THEN NormTemp−MAX[0,Te+2)/2]
ELSE NormTemp =MAX[0, (2−Te)/2)

Once the inputs of evaporator water temperature differential and leaving water temperature control error have been defined in terms of the membership function, i.e. fuzzified, the membership function is applied to a number of empirically determined rules to determine which rules "fire" in response to particular situations. The rules are as follows:

$SV1$ = MAX[MIN(Load,HighTemp),
　　　　MIN(Load,NormTemp),
　　　　MIN(Trans,High Temp)]

$SV1$ = MAX[MIN(Load,LowTemp),
　　　　MIN(Unload,LowTemp),
　　　　MIN(Trans,Low Temp)]

$SVH$ = MAX[MIN(Trans,NormTemp),
　　　　MIN(Unload,NormTemp),
　　　　MIN(Unload,HighTemp)]

$EXV1$ = MAX[MIN(Load,HighTemp),
　　　　MIN(Load,NormTemp),
　　　　MIN(Trans,High Temp),
　　　　MIN(Load,LowTemp)]

$EXV2$ = MAX[MIN(Unload,LowTemp),
　　　　MIN(Trans,LowTemp),
　　　　MIN(Unload,NormTemp)]

$EXVH$ = MAX[MIN(Unload,HighTemp),
　　　　MIN(Trans,NormTemp)]

SV is an abbreviation to indicate slide valve related information since that is the unloader 90 by which the present invention is preferably implemented. EXV is a standard abbreviation for an expansion device such as the expansion valve 30.

To then take the results of the fired rules and convert them into commands which enables the controller to act, i.e. defuzzified, the rules are defuzzied as follows:

$$SV=(SV1-SV2)/(SV1+SV2+SVH)$$

$$EXV=(EXV1-EXV2)/(EXV1+EXV2+EXVH)$$

Figure 4A:
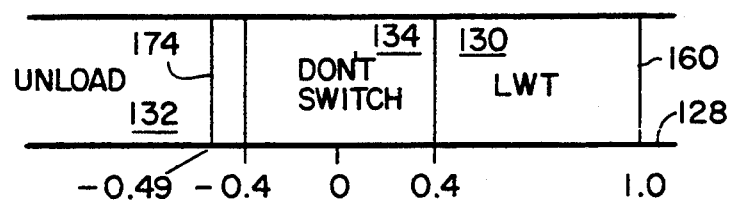
FIG. 4(a) is a graph showing how analog rules are converted to binary instructions to determine the mode of compressor capacity control.

SV and EXV are defuzzified analog values which provide an indication of the desired mode of system capacity control. FIG. 4a and b shows how the defuzzified analog results SV and EXV are converted into binary instructions so that a mode of capacity control can be implemented by the controller 60.

FIG. 4A is a linear graph showing how the analog SV value is converted into a binary command. The SV value is linearly represented by the line 128. The value of SV can fall into three regions: a region 130 where the unloader 90 is modulated in response to the leaving water temperature, a region 132 where the unloader 90 is maintained at minimum capacity and a region 134 where the unloader 90 is maintained unchanged in its previous control mode.

Specifically, if SV>0.4, conventional capacity control is accomplished by modulating the unloader 90 in response to leaving water temperature.

If SV < −0.4, then the extended unloading capacity control mode of operation is used and the unloader 90 is commanded to fully unload.

If −0.4 <SV <0.4, then the control mode previously in effect is continued.

Figure 4B:
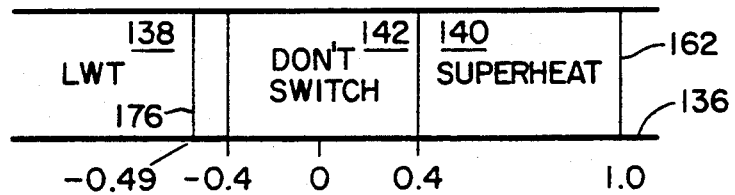
FIG. 4(b) is a graph showing how analog rules are converted to binary instructions to determine the mode of expansion valve control.

FIG. 4B is a linear graph showing how the analog EXV valve is converted into a binary command. The EXV value is linearly represented by the line 136, the value of EXV can fall into three regions: a region 138 where the expansion valve 30 is modulated in response to the leaving water temperature, a region 140 where the expansion valve 30 is modulated in response to superheat, and a deadband-like region 142 where the expansion valve 30 is maintained unchanged in its previous control mode.

Specifically, if EXV >0.4, then conventional superheat control is accomplished by modulating the expansion valve 30 in response to the superheat as measured by the sensor 96 and 97.

If EXV < −0.4, then the expansion valve 30 is controlled in the extended unloading mode of operation in response to leaving water temperature as measured by the sensor 80.

If −0.4 ≦EXV ≦0.4, then the control mode previously in effect is continued.

Generally, the value EXV will be in the region 140 when the value SV is in the region 130. The value EXV will be in the region 138 when the value SV is in the region 132.

Two examples are provided to show how the selection of the mode of operation for system capacity control is accomplished. In the first example, example 1, normal load conditions are illustrated. In the second example, example 2, extended unloading conditions are illustrated.

In example 1 the leaving water temperature control error (Te) is 1 as indicated by the line 150 in FIG. 3a. The evaporator water temperature differential (evapdt) is 5 as illustrated by the line 152 in FIG. 3b.

EXAMPLE 1

When the evaporator water temperature differential is fuzzified, the value of Unload is determined to be zero, the value of Load is determined to be 1.5 and the value of Trans is determined to be zero.

When the leaving water temperature control error is fuzzified the value of LowTemp is determined to be zero, the value of HighTemp is determined to be 0.3, and the value of NormTemp is determined to be 0.5.

These membership functions result in the rules firing as follows.

SV1 has minimum values of 0.3, 0.5, and 0 resulting in a value of 0.5 when the maximum is selected.

SV2 has minimum values of 0, 0, and 0 resulting in a value of 0 when the maximum is selected.

SVH also has minimum values of 0, 0, and 0 and also results in a value of 0 when the maximum is selected.

EXV1 has minimum values of 0.3, 0.5, 0 and 0 resulting in a value of 0.5 when the maximum is selected.

EXV2 has minimum values of 0, 0, and 0 resulting in a value of 0 when the maximum is selected.

EXVH has minimum values of 0 and 0 resulting in a value of 0 when the maximum is selected.

When the fired rules are defuzzified, the value of SV1 is determined to be 1 and the value of EXV is determined to be 1.

Referring now to FIG. 4a, the conversion of the analog value SV to a mode of system capacity control is indicated by the line 160 to be conventional leaving water temperature control. The conversion of the analog value EXV to a binary command is indicated in FIG. 4b to be convention superheat control by the line 162.

Example 1 illustrates that the conventional leaving water temperature and superheat control modes of system capacity control are used when the leaving water temperature error is fairly small and the evaporator water differential temperature is fairly large.

However, when the evaporator water differential temperature is smaller and the leaving water temperature error is greater, different results are expected. This is illustrated in Example 2 as follows.

EXAMPLE 2

In Example 2 the leaving water temperature control error (Te) is 3 as illustrated by the line 170. The evaporator water differential temperature is 1 as illustrated by the line 172.

When the evaporator water differential temperature is fuzzified, the Unload value is determined to be 1.42, the Load value is determined to be 0 and the Trans value is determined to be 0. When the leaving water temperature control error is fuzzified, the LowTemp is determined to be 0.67, the HighTemp is determined to be 0.7, and the NormTemp is determined to be 0.5.

When these membership functions are applied to the rules, the rules are fired as follows.

SV1 has minimum values of 0, 0 and 0 resulting in a value of 0 when maximized.

SV2 has minimum values of 0, 0.67, and 0 resulting in a value of 0.67 when maximized.

SVH has minimum values of 0, 0.5, and 0.7 resulting in a value of 0.7 when maximized.

EXV1 has minimum values of 0, 0, 0 and 0 resulting in a value of 0 when maximized.

EXV2 has minimum values of 0.67, 0, and 0.5 resulting in a value of 0.67 when maximized.

EXVH has minimum values of 0.7 and 0 resulting in a value of 0.7 when maximized.

When the results of the fired rules are converted into analog values, SV is determined to be minus 0.49 and EXV is determined to be minus 0.49. The conversion of the analog value SV to a binary command is illustrated in FIG. 4a by the line 174 indicates that the unloader 90 should be commanded to the minimum capacity position. The conversion of the value EXV to a binary command is illustrated in FIG. 4b by the line 176 indicates that the expansion valve 30 should be modulated in response to the leaving water temperature error.

From the foregoing, it is apparent that the present invention provides extended capacity and controls selection for water chiller systems. The invention provides an extended unloading capacity control wherein the compressor capacity control parameter is used to modulate the expansion valve. Since the same system can use conventional capacity control and the new extended unloading control, a method of determining which capacity control to use is also disclosed. It should be recognized that the invention applies to other chiller systems, that conventional variations are contemplated such as in the measurement of superheat, as in the implementation of the expansion device, as in the implementation of the compressor capacity controller, and as in the implementation of the fuzzy logic rules and membership functions and that modifications of such elements are contemplated to fall within the spirit and scope of the claims.

What is claimed as Letters Patent of the United States are:

1. A method of controlling the capacity of a chiller system, the chiller system including a circularly linked compressor, condenser, expansion device, and evaporator, the method comprising the steps of:
   measuring a first chiller system parameter;
   determining a first parameter error as a function of the difference between the first parameter and a first setpoint;
   measuring a second chiller system parameter;
   determining a second parameter error as a function of the difference between the second parameter and a second setpoint;
   providing a first mode of capacity control where the compressor is modulated in response to the first parameter error and the expansion valve is modulated in response to the second parameter error; and
   providing a second mode of capacity control where the compressor is maintained at a minimum capacity and the expansion valve is modulated in response to the first parameter error.

2. The method of claim 1 including the further step of providing, from the evaporator, a leaving fluid having a leaving fluid temperature, wherein the first parameter is the leaving fluid temperature as measured by a first sensor and the second parameter is refrigerant superheat as measured by a second sensor.

3. The method of claim 2 wherein the leaving fluid is water.

4. The method of claim 3 including the further steps of:
   measuring the temperature of water entering the evaporator;
   determining an evaporator temperature differential as a function of the difference between entering water temperature and leaving water temperature; and
   selecting either the first or the second mode of capacity control as a function of the evaporator temperature differential.

5. The method of claim 4 wherein the selecting step includes the use of fuzzy logic.

6. A method of controlling the capacity of a chiller system, the chiller system including a circularly linked compressor, condenser, expansion device, and evaporator, where the evaporator receives entering water having an entering water temperature and provides leaving water having a leaving water temperature and where the compressor compresses refrigerant having a measured superheat, the method comprising the steps of:
   measuring the leaving water temperature and the refrigerant superheat;
   determining a leaving water temperature error as a function of the difference between the leaving water temperature and a setpoint;
   providing a first mode of capacity control wherein the compressor is modulated in response to the leaving water temperature error and the expansion valve is modulated in response to the measured superheat; and
   providing a second mode of capacity control where the compressor is maintained at its minimum capacity and the expansion valve is modulated in response to the leaving water temperature error.

7. The method of claim 6 including the further steps of:
   determining an evaporator temperature differential as a function of the difference between the entering water temperature and the leaving water temperature; and
   selecting and implementing a mode of capacity control as a function of evaporator differential temperature and leaving water temperature error.

8. The method of claim 7 wherein the selecting and implementing step includes the further step of using fuzzy logic to select the mode of capacity control.

9. The method of claim 8 wherein the fuzzy logic includes membership rules which are functions of the evaporator differential temperature and the leaving water temperature error.

10. A method of controlling the capacity of a chiller system comprising the steps of:
    determining a needed capacity for the chiller system;
    adjusting a compressor flow control means to meet the needed capacity;
    repositioning an expansion valve in response to the adjusting step;
    determining if the compressor flow control means is at an end of range capacity; and
    modulating the position of the expansion valve to control chiller system capacity whenever the flow control means has been determined to be at an end of capacity range.

11. The method of claim 10 including the further step of determining a mode of capacity control as a function of an evaporator water temperature differential and a leaving water temperature error.

12. A method of controlling the capacity of a water chiller system having a variable capacity compressor, a variable capacity expansion device, and an evaporator having a leaving water temperature, the method comprising the steps of:
    measuring the leaving water temperature;
    comparing the leaving water temperature to a setpoint so as to determine an error;
    modulating the compressor capacity to minimize the error unless the compressor capacity is at a minimum capacity position;
    maintaining the compressor at the minimum capacity position; and
    modulating the expansion device to minimize the error.

13. A method of selecting between first and second modes of capacity control for a water chiller system including an evaporator having an entering fluid temperature and a leaving fluid temperature, the method comprising the steps of:
    determining the leaving fluid temperature;
    determining the entering fluid temperature;

determining a differential temperature as a function of the difference between the leaving fluid temperature and the entering fluid temperature;

determining a temperature error as a function of the difference between the leaving fluid temperature and a setpoint; and selecting either the first or second mode of capacity control as a function of the temperature differential and the temperature error.

14. The method of claim 13 wherein the fluid is water.

15. The method of claim 13 wherein the selecting step includes the further steps of:

defining a first fuzzy logic membership as a function of the temperature error;

defining a second fuzzy logic membership as a function of the differential temperature;

applying at least one predetermined set of fuzzy logic rules to the first and second fuzzy logic memberships to obtain at least one result;

converting the at least one result to one or more commands indicative of either the first or second mode of capacity control; and commanding said mode of capacity control.

16. The method of claim 15 wherein the water chiller system includes an expansion device and an unloader and wherein the converting step includes the further steps of:

establishing a first mode of operation for the expansion device if the at least one result exceeds a first empirically determined value;

establishing a second mode of operation for the expansion device if the at least one result is less than a second empirically determined value;

establishing a first mode of operation for the unloader if the at least one result if greater than a third empirically determined value; and establishing a second mode of operation for the unloader if the at least one result is less than a fourth empirically determined value.

17. The method of claim 16 wherein the first and third empirically determined values are 0.4 and the second and fourth empirically determined values are $-0.4$.

18. The method of claim 15 wherein the step of defining a first fuzzy logic membership includes the further step of defining the temperature error (Te) as low, high, or normal;

where the low definition is a function of $(Te-C1)/C2$;

where the high definition is a function of $(Te+C3)/C4$;

where the normal definition is a function of $(C5 \pm Te)/C6$; and where C1 through C6 are constants.

19. The method of claim 15 wherein the step of defining a second fuzzy logic membership includes the further step of defining the differential temperature (evapdt) as unload, load, or trans;

where the unload definition is a function of $(C7-evapdt)/C8$;

where the load definition is a function of $(evapdt-C9)$;

where the trans definition is a function of either $(evapdt-C10)$ or $(C11-evapdt)$; and where C7 through C11 are constants.

* * * * *